Patented Feb. 9, 1932

1,844,570

UNITED STATES PATENT OFFICE

HANS GOLDSCHMIDT, DECEASED, LATE OF BERLIN-GRUNEWALD, GERMANY, BY MARIE ISOLINA GOLDSCHMIDT, NÉE WARING, ADMINISTRATRIX, OF BERLIN-GRUNEWALD, GERMANY, AND OSKAR NEUSS, OF BERLIN-CHARLOTTENBURG, GERMANY, ASSIGNORS, BY MESNE ASSIGNMENTS, TO SYNTHETIC PLASTICS COMPANY, INCORPORATED, OF NEW YORK, N. Y., A CORPORATION OF DELAWARE

ARTIFICIAL RESIN AND PROCESS OF MAKING THE SAME

No Drawing. Original application filed September 30, 1922, Serial No. 591,639, and in Germany October 17, 1921. Divided and this application filed June 25, 1931. Serial No. 546,914.

Our invention relates to improvement in bodies made from urea and formaldehyde and also in the process for the manufacture of such bodies.

More particularly the invention relates to a process in which urea and formaldehyde are combined by heat into bodies which have a cloudy appearance and resemble meerschaum.

The preparation of artificial masses by condensation of urea with formaldehyde is well known. Hitherto, transparent masses, as clear as glass have been obtained by using rather large excesses of formaldehyde, (5 to 6 parts of 40% formaldehyde to 1 part of urea). These are at first soft and then, however, gradually harden in consequence of subsequent condensation and loss of water. The well known reaction can be hastened by using small amounts of inorganic or organic acids. This applies especially to the hardening. The result can also be attained by the use of a solution of formaldehyde containing acid, for example, formic acid. Exceedingly small amounts of acid are required for this purpose. In the case of inorganic acids, about 0.06% of the weight of urea used suffices.

It is an object of this invention to provide a process which may be carried out economically and efficiently and within a comparatively short period of time. The invention further provides a process in accordance with which products may be obtained having properties which render them well adapted to various uses.

With these objects in view, our invention consists in adding to urea and formaldehyde a condensing medium such as a concentrated inorganic acid in an amount of about 5% of the mixture. This application is a division of our co-pending application, Serial No. 591,639, filed September 30, 1922, for process for making resins, in which the use of an acid in making urea-formaldehyde condensation products is claimed broadly. This application also corresponds to our application for German Letters Patent, filed October 17, 1921.

We have found that by using such amounts of an acid condensing medium the amount of formaldehyde required may be reduced. The products, which are obtained by the condensation of urea and formaldehyde in which smaller quantities of formaldehyde and considerably larger quantities of the acid condensing medium are employed, are quite different from clear glasslike products. When the acid condensing medium used is in greater amount and when the relative amount of formaldehyde is reduced, the products are porous masses resembling meerschaum and according to the details of the process they may be quite soft or hard as meerschaum. The bodies obtained may be readily worked in various ways as by filing, machining, planing, cutting, turning or rasping. In consequence of their porosity they may be impregnated with solutions of dye stuffs or with oils, resins, artificial resins, solutions of salts and the like.

As illustrative of a manner in which the invention may be carried out in practice, the following examples are presented:

*Example 1.*—20 grams of urea are dissolved in 60 grams of formaldehyde of about 30 per cent. strength and the solution diluted with about 20 grams of water. The mixture is then heated until it foams, whereupon 5 grams of nitric acid (sp. gr. 1.4) are added. The mixture upon cooling sets to form hard bodies. The reaction is a strongly exothermic one depending on the reactive conditions, such as the manner of heating, the character of the vessel and the quantities used. Further, the heat given off by the reaction may be of such an amount that further heating will not be required.

*Example 2.*—20 grams of urea are dissolved in 60 grams of 30 per cent. formaldehyde and diluted with 20 grams of water. The mixture is heated to foaming, whereupon 5 grams of sulphuric acid (sp. gr. 1.84) are added. The mixture is then poured into molds.

*Example 3.*—20 grams of urea are dissolved in 60 grams of formaldehyde of a strangth of 30 per cent. and diluted with 20 grams of water. This mixture is then heated until it forms, whereupon 5 cc. of concentrated hydrochloric acid are added. The reaction mass is then poured into molds.

The products obtained according to the foregoing procedures are dull and cloudy and have the appearance of meerschaum or porcelain. If a smaller amount of formaldehyde is used than that hereinabove given, the resulting bodies are softer, and if the amount of formaldehyde is increased, the bodies are harder.

The artificial bodies are porous and are capable of absorbing about double their weight in water without swelling. However, when they remain in contact with water for a long time, a swelling takes place. The apparent specific gravity of the products according to our process is in consequence of the porosity about 0.8035.

Having described our invention, what we claim as new and desire to secure by Letters Patent, is:

1. The herein described process for producing a condensation product which comprises heating a mixture containing 20 grams of urea, about 60 grams of formaldehyde having a strength of 30 per cent. and about 20 grams of water to foaming and then adding about 5 grams of a concentrated inorganic acid condensing medium.

2. The herein described process for producing a condensation product which comprises heating a mixture containing 20 grams of urea, about 60 grams of formaldehyde having a strength of 30 per cent. and about 20 grams of water to forming and then adding about 5 grams of a concentrated inorganic acid of the group consisting of hydrochloric acid, sulphuric acid and nitric acid.

3. The herein described process for producing a condensation product which comprises heating a mixture containing 20 grams of urea, about 60 grams of formaldehyde having a strength of 30 per cent., about 20 grams of water and about 5 grams of a concentrated inorganic acid of the group consisting of hydrochloric acid, sulphuric acid and nitric acid.

4. As a new product a condensation product of urea and formaldehyde prepared in the presence of water and about 5 per cent. of an acid condensing medium, which is cloudy, resembling meerschaum, porous and capable of absorbing about double its weight of water without swelling and having a specific gravity in its porous state of about 0.8035.

MARIE ISOLINA GOLDSCHMIDT, née WARING,
*Administratrix of the Estate of Hans Goldschmidt, Deceased.*
OSKAR NEUSS.